United States Patent

[11] 3,614,760

[72] Inventors Arthur L. Zimmet
203 East 76th St., New York, N.Y. 10021;
Milton P. Chernack, 299 June Place, West Hempstead, N.Y. 11552

[21] Appl. No. 787,456
[22] Filed Dec. 27, 1968
[45] Patented Oct. 19, 1971
[73] Assignees Arthur L. Zimmer;
Milton P. Chernak; Murray S. Trachtenberg, Bayside, N.Y., part interest to each

[54] SIGNALING APPARATUS
11 Claims, 11 Drawing Figs.

[52] U.S. Cl. ........ 340/224, 325/185, 331/116, 331/185, 340/170, 340/227
[51] Int. Cl. ........ G08b 5/22
[50] Field of Search ........ 340/224, 170; 325/185; 331/116, 66, 185

[56] References Cited

UNITED STATES PATENTS

| | | | |
|---|---|---|---|
| 2,627,004 | 1/1953 | Ouellette | 340/227.1 X |
| 3,077,574 | 2/1963 | Marks | 325/185 X |
| 3,094,661 | 6/1963 | Herrman et al. | 340/170 X |
| 3,310,983 | 3/1967 | Boulais et al. | 340/224 X |
| 3,457,522 | 7/1969 | Kosta | 325/185 X |
| 3,487,398 | 12/1969 | Rieth | 331/185 X |

*Primary Examiner*—John W. Caldwell
*Assistant Examiner*—David L. Trafton
*Attorney*—Hubbell, Cohen & Stiefel

ABSTRACT: A signaling system employs a transmitter energized by a momentary power generator which responds to a brief mechanical input. The input may be due to intentional signaling activity, unintentional triggering of a gurglar detection device, or it may be in response to an ambient condition such as elevated temperatures indicating a fire is in progress. The mechanical event vibrates a spring-mass pendulum. The vibrating mass traverses an airgap in a magnetic circuit to induce an alternating potential in a signal output coil. The output of this generator is rectified to provide power for one or more radio frequency transmitters, and in addition may be used as the modulating signal impressed upon the radio frequency carrier. Two radio frequency transmitters operating at different carrier frequencies may be modulated by different phase components of the generator frequency. Alternatively, the modulation may be supplied by one or more subcarrier generators energized by the mechanical power generator. For greater noise immunity, a variation of this system may employ coded combinations of subcarrier frequencies.

INVENTORS
ARTHUR L. ZIMMET
MILTON P. CHERNACK
BY Hubbell, Cohen & Stiefel
ATTORNEYS.

INVENTORS
ARTHUR L. ZIMMET
MILTON P. CHERNACK
BY
[signature]
ATTORNEYS.

INVENTORS
ARTHUR L. ZIMMET
MILTON P. CHERNACK
BY
ATTORNEYS.

INVENTORS
ARTHUR L. ZIMMET
MILTON P. CHERNACK

BY Hubbell, Cohen, Stiefel
ATTORNEYS.

SIGNALING APPARATUS

FIELD OF THE INVENTION

The invention is broadly applicable to wireless remote signaling devices and systems of many different kinds. Some specific examples are wireless doorbells, wireless fire and/or burglar alarms, and wireless remote control systems.

THE PRIOR ART

Many types of signal generators and communication systems have been suggested for the purpose of announcing visitors, detecting intruders or dangerous conditions such as fires, and for turning on lights or other appliances at remote locations. Some of these systems are wireless, in the sense that the signal is sent from the signal generator to the receiver at a remote location without the need for a hard wired connection therebetween. Various kinds of energy have been employed to convey such signals, for example light beams, acoustic vibrations, and radio waves. The radio approach is probably the most practical and reliable of these, but previous systems using the radio approach have suffered from various problems. For example, a power supply such as a battery or a connection to house current was needed to operate the radio frequency transmitter. Another problem was the relative susceptibility of low-power radiofrequency communication systems to radiofrequency noise, including interference radiated by nearby electrical appliances.

In an entirely different area of the technology, the prior art has developed many devices for generating electrical energy both for power and for communication. Unlike most power-generating stations and communications transmitters, some of these have not employed energy sources established specifically for that purpose, but instead have been designed to take incidental advantage of energy sources which were already available for other reasons. Examples which come to mind are windmill-driven electrical power generators and hand-cranked telephone bell ringers. However, the windmill-driven power generators and similar devices are designed for continuous generation of electrical power and are not adapted for intermittent signaling applications.

Hand-cranked telephone bill ringers are not adapted for automatic operation to report ambient conditions, and they suffer from the additional disadvantage that the signal terminates immediately when the crank stops turning, instead of decaying gradually.

Accordingly, the prior art has failed to provide a radio signaling system which does not require the continuous availability of electrical power or some natural source of energy, which relies instead upon the energy released in response to occasional intentional or unintentional events or ambient conditions, which continues to send a signal for a brief interval after the actuating event is over, and which achieves a higher degree of noise immunity than is usual with low-power radio communications systems.

SUMMARY AND OBJECTS OF THE INVENTION

One object of the invention is to provide a remote signaling system which includes a transmitter at a remote location operating independently or conventional power sources such as batteries or powerline connections. The transmitter is powered by a small, compact and simple mechanical generator which is actuated by occasional events such as the intentional pushing of a doorbell button, the unintentional tripping of a burglar detection device or the occurrence of ambient conditions such as elevated temperatures or the like. The mechanical generator of this invention has the additional advantage that it continues to resonate for at least a brief decay interval after the occurrence of the actuating event, so that the operation of the signaling transmitter is prolonged.

Another important objective of the invention is to provide a high degree of immunity from radiofrequency interference and other types of noise which might otherwise create a risk of spurious operation. In particular, the resonant frequency of the mechanical generator is converted into an electrical signal frequency and used to modulate the radiofrequency carrier wave, or alternatively is used to energize one or more signal generators which in turn modulate the carrier wave. In addition, different modulation frequencies or different phase components of a single modulation frequency are used in combinations to provide phase or frequency coding which renders the system relatively immune from radiofrequency noise.

DETAILED DESCRIPTION OF THE PREFERRED EMBODIMENTS

Figures 1, 2, 3, 4, 5:
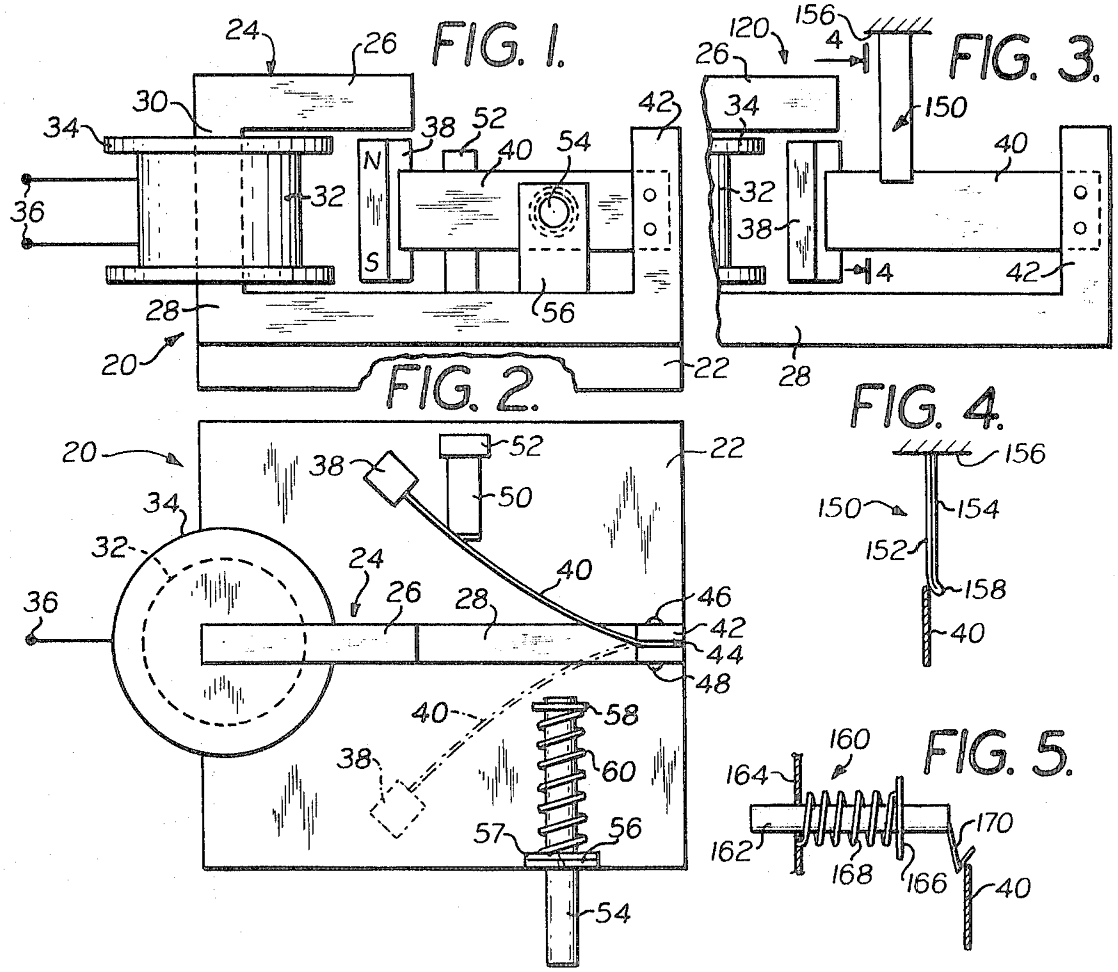
FIG. 1 is a side elevational view of a mechanical signal generator in accordance with one aspect of this invention.
FIG. 2 is a top plan view of the mechanical signal generator of FIG. 1, showing the amplitude of mechanical oscillation of the resonant system thereof.
FIG. 3 is a side view of a mechanical signal generator utilizing a bimetal latch element for the resilient arm of the generator.
FIG. 4 is a fragmentary sectional view, taken along the lines 4—4 of FIG. 3, of the resilient arm of the generator of FIG. 3 and its bimetal latch element.
FIG. 5 is a fragmentary view, with parts sectioned, of an alternative vibrating mechanism for the resonant system of the mechanical signal generator.

The mechanical generator 20 illustrated in FIGS. 1 and 2 is designed to generate a briefly sustained alternating electrical potential in response to a momentary mechanical input. Mounted upon a rectangular base 22 is a substantially C-shaped iron frame 24. The upper leg 26 of this frame forms one pole piece of a magnetic circuit, and the lower leg 28 forms the opposite pole piece thereof. The connecting leg 30 passes through the center of a coil 32 of electrical wire wound about a bobbin 34. Thus, the C-shaped frame 24 forms a magnetic circuit, the flux lines of which link the coil 32 so that any flux variations will induce a voltage in that coil. Output leads 36 are provided for the voltage induced in coil 32.

An airgap between the pole pieces 26 and 28 is bridged by a permanent magnet 38 in the form of a rectangular bar suspended at the end of a horizontal arm 40 cantilevered at its other end upon an upstanding supporting post 42. The supporting post 42 is a vertical extension of the elongated end of the lower leg 28. The fixed end of the arm 40 is accommodated within a slit 44 formed at the upper end of the supporting post 42, and is secured therein by appropriate fastening means 46 and 48. The arm 40 is formed of a resilient metallic material such as spring steel or the equivalent. The arm 40 and the mass of the bar magnet 38 at the end of the cantilever form a spring-mass pendulum capable of vibrating sinusoidally in a horizontal plane as illustrated by the solid and dotted line representations in FIG. 2, showing the two extremes of oscillation. Such oscillations cause the magnet 38 to transmit a time-varying flux through the magnetic circuit 26, 30, 28, 38, which induces an alternating output potential in the coil 32, appearing across the leads 36.

The mechanical vibrating system which comprises the magnet 38 and resilient arm 40 can be actuated in a number of ways and by a number of different types of mechanical inputs. For example, as shown in FIGS. 1 and 2, there may be provided a latching means 50 extending horizontally outwardly from a vertical supporting post 52 which rises vertically from the base 22. The latching mechanism 50 has been shown as a bar magnet which attracts and holds the steel arm 40, although a mechanical latch or other known form of restraining mechanism could also be used. The spring-mass system 38, 40 is designed to be dislodged from its latched condition by means of any convenient mechanism, not shown, actuated by a particular event. For example, it could be dislodged and set into vibration unintentionally by means of an actuator which responds to the opening of a window or door when a burglar attempts to enter a house. In that case the alternating potential induced by the oscillating magnet 38 could be used to actuate a burglar alarm at a remote location.

Thus, the signal generator 20 provides a mechanism which delivers an electrical signal when a mechanical event dislodges the spring-mass system 38, 40 from its latched condition. This is useful at a remote location where it is inconvenient or undesirable to provide conventional power supplies. For signaling purposes, it is essential that the generator 20 provide discrete signals correlated with the events to be signaled, e.g., one signal for each time that the opening of a door or window or other mechanical event is detected. Conventional generators such as the windmill-driven type, which have been used to generate power at remote locations without conventional power supplies, operate continuously and therefore do not correlate their output with particular events as required for signaling applications.

However, the signal has a somewhat longer duration than the mechanical event which triggers it, owing to the decay time of the resonant mechanical system 38, 40. When dislodged from its latched condition, this system continues to oscillate for a brief interval after the initiating event, while its oscillations gradually decay and eventually die out. During that interval, it continues to generate an alternating potential for signaling purposes. This provides a longer duration for each such discrete signal, and is therefore more effective in getting attention.

After each actuation, the spring-mass system 38, 40 is reset by means of a plunger 54 reciprocable within registered apertures formed in vertical members 56 and 58 rising from the base 22. A return compression spring 60 is seated on plunger 54 between member 58 and a collar 57 secured to the plunger 54. The plunger 54 can be pushed toward the resilient arm 40, flexing the arm 40 into engagement with the latch 50. Subsequently, the plunger 54 is released and returned to its original position by the spring 60 pushing against the collar 57 and moving the collar back to member 56. It will be obvious that latch 50 can be actuated by any suitable means such as a window-actuable linkage, as in a burglar alarm, or a thermal responsive linkage, as in a fire alarm, or a radiation responsive linkage, as in a radiation alarm, in order to release cantilever 40 and generate signal power.

FIGS. 3 and 4 show a variation 120 of the signal generator seen in the previous figures. Most of the elements of the alternating signal generator 120 are identical to corresponding elements of the signal generator 20, and are given the same reference numerals. However, in the embodiment of FIGS. 3 and 4 the mechanically actuable latch 50 is replaced by a bimetallic latch 150 comprising dissimilar metals 152 and 154 secured together and attached at one end to any nearby fixed support 156. In this embodiment the resilient arm 40 is flexed until it is latched behind the tip 158 of the bimetallic latch 150, as illustrated in FIGS. 3 and 4. This latching operation can be accomplished manually, or a reset plunger similar to plunger 54 of FIGS. 1 and 2 can be provided. When the ambient temperature reaches an elevated threshold level, indicating the presence of a fire, the bimetallic element 150 flexes sufficiently to release the arm 40 from latching engagement therewith. At that point, the spring-mass system 38, 40 is set into vibration, and a signal potential is induced in the coil 32 and made available for operating a remote fire alarm. Other ambient conditions can be monitored in a similar manner, using appropriate sensors in place of the thermally responsive element 150.

The spring-mass system 38, 40 can also be operated in another mode; i.e. it can be left in a rest position, and plucked or twanged when it is desired to set it into resonant vibration. Accordingly, in still another alternative embodiment of the signal generator a plucking mechanism 160 of the kind shown in FIG. 5 may be provided. This mechanism comprises a plunger 162 guided within an opening in a vertical plate 164. A collar 166 is secured near the end of the plunger, and a coil spring 168 is engaged between the collar 166 and plate 164. At the end of the plunger is secured a resilient V-shaped metallic finger 170 adapted to cam resiliently over the arm 40 of the signal generator in either direction. Accordingly, the plunger 162 can be moved inwardly to hook the finger 170 over the blade 40, after which the plunger is pulled back so that the finger 170 flexes the arm 40 to one extreme. As the plunger 162 is pulled back still farther, the finger 170 eventually releases the arm 40 which then snaps into resonant vibration to generate a signal voltage. This type of mechanism is suitable for wireless doorbells and other intentional manual signaling applications.

Figures 6, 9:
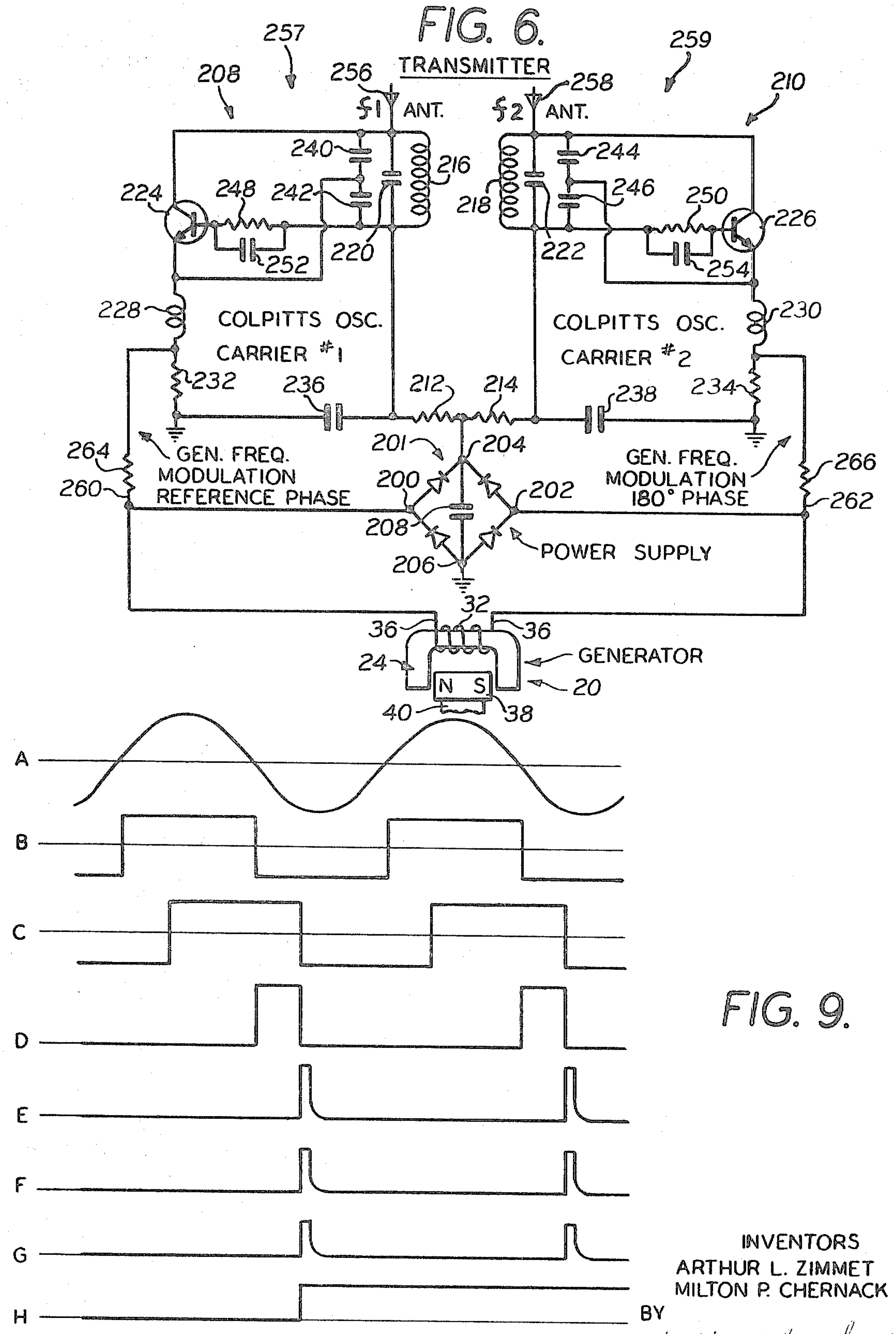
FIG. 6 is a schematic circuit diagram of a dual-frequency signal transmitter for use in a signaling system designed in accordance with another aspect of this invention.
FIG. 9 is a series of consecutive signal wave forms appearing at consecutive signal-processing points within the circuit of FIG. 8. The points at which waveforms A through H of FIG. 9 appear are shown by reference characters A through H respectively in FIG. 8.

One type of remote radio signaling transmitter employing the kind of generator just described is shown in FIG. 6. There the resilient arm 40 oscillating together with the magnet 38 of generator 20 applies a varying flux to the magnetic circuit 24 to induce an alternating potential in the output coil 32. This alternating potential, which is made available over the leads 36, is used quite uniquely in two distinct ways in the transmitter circuit of FIG. 6.

First, the alternating output potential of the generator 20 is applied to the corners 200 and 202 of a conventional semiconductor diode rectifier bridge 201. As a result, during the interval while the spring-mass system 38, 40 is resonating, full wave rectified DC power is made available across the other corners 204 and 206 of the bridge 201. A portion of the resulting ripple voltage is short circuited by a filtering capacitor 208 connected across the DC output terminals. The negative output terminal 206 is grounded, and the positive output terminal 204 of the rectifier circuit provides B+ voltage to a pair of Colpitts oscillator circuits 208 and 210.

The B+ voltage is applied through respective limiting resistors 212 and 214 to respective inductors 216 and 218 which, together with respective capacitors 220 and 222, form the oscillator tank circuits. The other end of each tank circuit is connected to the collector of respective transistors 224 and 226. The return path for the DC power proceeds from the emitter electrode of each transistor through respective radiofrequency chokes 228 and 230 and emitter load resistors 232 and 234 to ground. Respective capacitors 236 and 238 provide additional ripple filtering.

The circuits 208 and 210 are emitter follower transistor Colpitts oscillators having the usual capacitive voltage dividers 240, 242 and 244, 246 respectively connected across the tank circuits to establish a desired level of feedback The base connections of transistors 224 and 226 are provided by limiting resistors 248 and 250, shunted by respective capacitors 252 and 254 to provide low-impedance radiofrequency feedback paths. Each of the oscillators 208 and 210 is tuned to its own respective radio carrier frequency, designated $f1$ and $f2$ in FIG. 6. Respective antennas 256 and 258 are provided for radiating at carrier frequencies $f1$ and $f2$. Thus, oscillator 208 and its antenna 256 comprise a first radiofrequency transmitter 257 broadcasting at frequency $f1$, while oscillator 210 and its antenna 258 comprise a second radiofrequency transmitter 259 broadcasting at frequency $f2$. Both transmitters broadcast only during the short interval when resonant vibration of the spring-mass system 38, 40 of generator 20 provides the necessary power for energizing the oscillator circuits.

But the generator voltage is not only used as a power supply for the oscillators 208 and 210. It is also applied over leads 260 and 262, limiting resistors 264 and 266, and chokes 228 and 230 respectively to modulate the outputs of the transmitters 257 and 259. The alternating output potential of the generator 20, at the frequency of mechanical vibration of the spring-mass system 38, 40, develops an alternating modulation signal across the respective emitter load resistors 232 and 234. This signal is applied to the emitters of the respective transistors 224 and 226 through the R.F. chokes 228 and 230, which present a low impedance to the relatively low frequency of the vibrating mechanical system 38, 40. This modulating signal applied to the emitters of the transistors modulates the amplitude of the carrier frequency waves $f1$ and $f2$ transmitted by the antennas 256 and 258. Thus, the present invention uniquely employs a mechanical generator, triggered by a local mechanical event, to supply electrical power as well as a signal frequency to modulate the carrier wave of one or more local transmitters requiring no conventional source of power.

The modulating signal at the generator frequency is applied to the two oscillators 180° out of phase. One side of output coil 32 goes positive while the other side goes negative. Accordingly, the modulating output on lead 260 connected to one side of the coil represents one phase, while the modulating output of lead 262 connected to the other side of coil represents the opposite phase. Consequently the carrier waves at respective frequencies $f1$ and $f2$ of transmitters 257 and 259 are modulated 180° out of phase with each other. The simultaneous transmission of a particular carrier frequency $f1$ modulated by one phase of a particular generator frequency, and a particular carrier frequency $f2$ modulated by the opposite phase of the same generator frequency, is an event which is unlikely to be imitated by any noise source.

Figure 7:
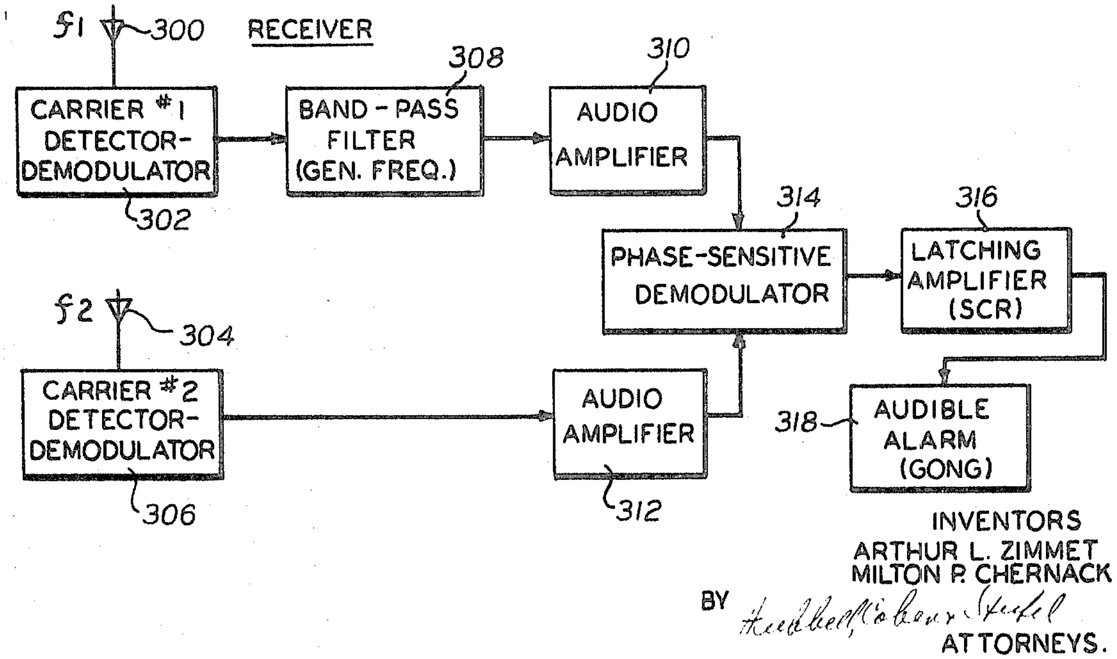
FIG. 7 is a functional block diagram of a receiver for use with the transmitter of FIG. 6 in the same signaling system.

The circuit of FIG. 7 illustrates a receiver for use with the transmitter circuit of FIG. 6. There it is seen that a first antenna 300 picks up the carrier wave of frequency $f1$ and passes it on to a tuner 302 tuned to that particular carrier frequency. A second receiving antenna 304 picks up the carrier wave of frequency $f2$ and passes it on to a second tuner 306 tuned to the latter carrier frequency. Ignoring band-pass filter 308 for the moment, the outputs of the turners 302 and 306, comprise the generator frequency modulating signals, are passed along to amplifiers 310 and 312 respectively. The outputs of both amplifiers are applied to a phase-sensitive demodulator circuit 314 designed to detect the simultaneous input of two signals both having the frequency of generator 20, but 180° out of phase with each other. When such conditions exist, an output from the circuit 314 triggers a silicon-controlled rectifier latching amplifier circuit 316. The latching action enables the relatively brief signal radiated by the transmitter of FIG. 6 to produce an enduring effect. The latching amplifier 316, when triggered, turns on an output device such as a gong or other audible alarm 318.

The invention could be practiced with only a single transmitter such as transmitter 257 of FIG. 6 powered and modulated by the generator 20. In that case only a single carrier frequency $f1$ would be broadcast, and only a single receiving channel such as tuner 302, filter 308 and amplifier 310 would be sufficient to drive the latching amplifier 316 and the output device 318 in FIG. 7. The second transmitter and receiver channel for frequency f2 would not be required, nor would the phase-sensitive demodulator circuit 314 of FIG. 7. However, such a remote control radio frequency system would be subject to interference radiated at the carrier frequency and having a generator frequency component impressed thereon. The two-carrier system of FIGS. 6 and 7 is considerably more immune to radiofrequency noise.

Immunity to radiofrequency noise is greatly improved by the use of the filter 308, which is preferably of the band-pass type which offers a low impedance to a narrow band centered around the modulation frequency of the generator 20, but sharply cuts off frequencies above and below. A low pass or high pass filter could be used instead, but a band-pass filter is preferred for maximum noise immunity. If desired, a similar filter or other frequency discriminating device could be inserted in the reception channel for carrier frequency $f2$, between tuner 306 and amplifier 312. However, for most applications sufficient noise immunity would be conferred upon the system of FIGS. 6 and 7 with only the single filter 308 inserted in one of the reception channels in view of the low probability that radiated interference would present both carrier frequencies f1 and f2 modulated by the generator frequency in a 180° phase relationship.

Figure 8:
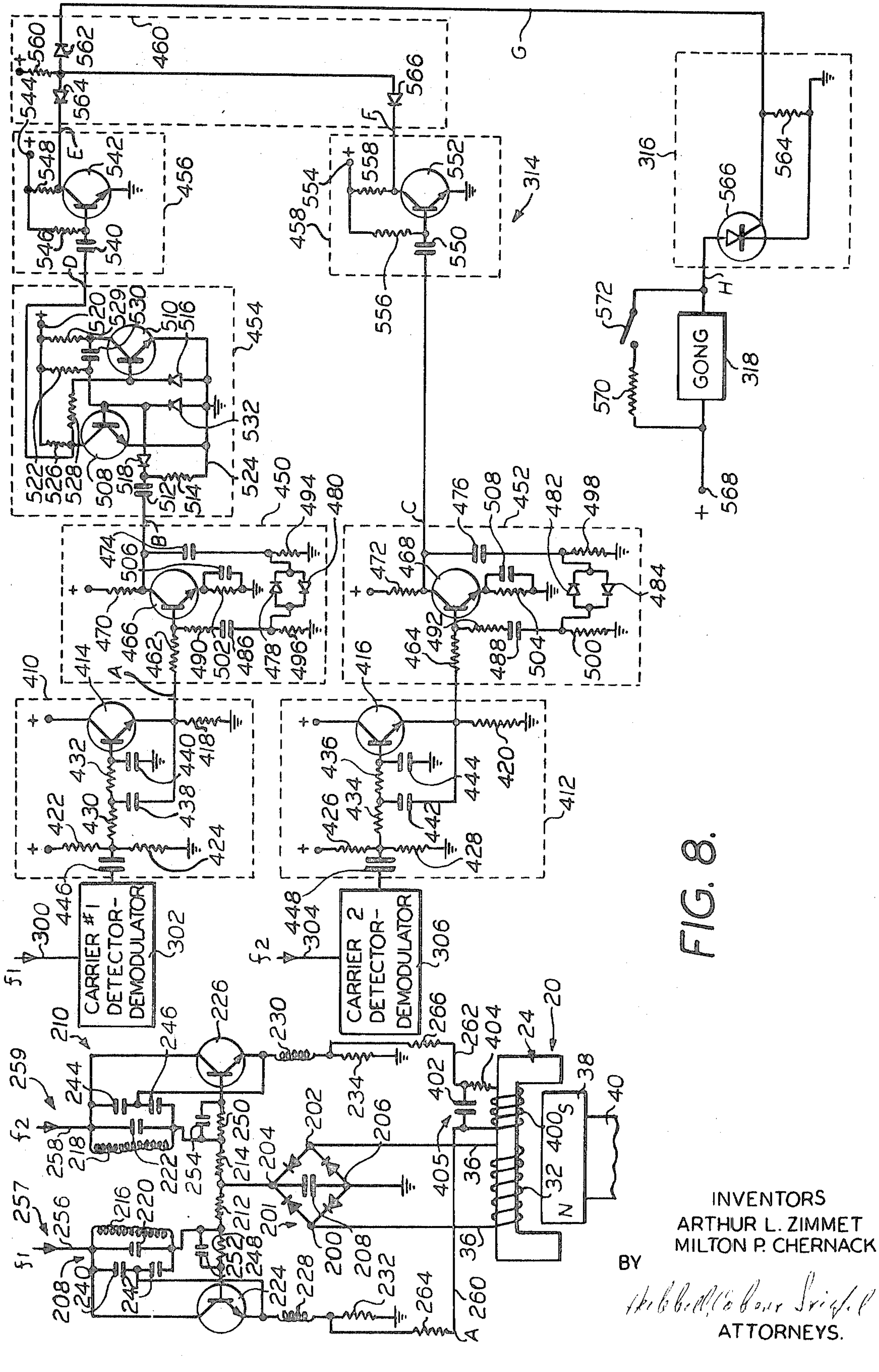
FIG. 8 is a schematic circuit diagram, with certain circuits shown as functional blocks, of a complete signaling system according to an alternative embodiment of this invention.

While various forms of circuitry are well known for performing the functions of the components illustrated in the block diagram of FIG. 7 and described above, the presently preferred circuit arrangement for performing these and additional functions are illustrated in FIG. 8. Certain of the components of FIG. 8 are identical to those of FIG. 7 and bear the same reference numerals.

Referring now to FIG. 8, it is seen that a pair of transmitters 257 and 259 comprising respective oscillators 208 and 210 and antennas 256 and 258 transmit their respective carrier frequencies $f1$ and $f2$ when energized by the B+ voltage at terminal 204 of a diode bridge full-wave rectifier circuit 201. The rectifier 201 in turn derives power from winding 32 of generator 20 when a mechanical input sets the spring-mass system 38, 40 into resonant vibration. Once again, leads 260 and 262 apply respective modulating signals comprising two different phases of the alternating voltage developed by the generator 20. In this case however, the modulating signal is provided by an auxiliary winding 400 wound on the same core, i.e. frame 24, as the power supply coil 32. Another difference is that the phase difference between the modulating signals on the leads 260 and 262 need not be 180° as in FIG. 6, but instead depends upon the values chosen for a capacitor 402 and a resistor 404 which comprise a phase shift network 405.

Once again, carrier frequency $f1$ is picked up by an antenna 300 and detected by a detector demodulator circuit 302 identical to the tuner 302 of FIG. 7. Similarly, carrier frequency $f2$ is picked up by an antenna 304 and applied to a detector demodulator circuit 306 identical to the tuner 306 of FIG. 7. The demodulator outputs of these circuits are applied to low-pass filter circuits 410 and 412 respectively. Each filter is of the active type employing respective emitter follower transistor stages 414 and 416. The circuit outputs are developed across respective emitter load resistors 418 and 420, while DC base-biasing levels are established by respective resistive voltage dividers 422, 424 and 426, 428. The signal input is through respective pairs of L-section filter networks comprising resistor 430, capacitor 438 and resistor 432, capacitor 440 in circuit 410; and resistor 434, capacitor 442 and resistor 436, capacitor 444 in circuit 412. Respective capacitors 446 and 448 at the inputs of the filter networks provide AC coupling to the outputs of the detector demodulator circuits. The low-pass filters 410 and 412 serve essentially the same noise rejection function as the band-pass filter 308 of FIG. 7. In addition, since they incorporate amplifying stages 414 and 416, the filter circuits also inherently perform the function of amplifier circuits 310 and 312 of FIG. 7.

Just as in FIG. 7, the modulation frequency signals (i.e. the outputs of filters 410 and 412) are both applied to a phase-sensitive demodulator circuit 314. The circuit 314 is illustrated in functional block form in FIG. 7. But in FIG. 8 a particular example of a phase-sensitive demodulator 314 which may be employed in either system is shown in full-circuit detail. The only difference between the circuits is that FIG. 7 requires detection of a 180° phase difference, whereas in FIG. 8 the phase difference may be some other value determined by network 405.

The circuit 314 includes a pair of squaring amplifiers 450 and 452, a delay circuit 454 in the form of a monostable multivibrator (or one-shot ) designed to produce the desired delay interval, a pair of differentiating amplifiers 456 and 458, and an AND-gate 460.

The operation of the phase-sensitive demodulator 314 in triggering the latching amplifier 316 is best understood in terms of the sequence of voltage waveforms in FIG. 9. There waveform A represents the sinusoidal modulating signal applied to either one of the transmitters such as transmitter 257. Let us say for example that waveform A is applied over the lead 260 to modulate the oscillator 208 of transmitter 257 as indicated by reference character A in FIG. 8. Then waveform A will also represent the output of the filter 410 which passes the audio frequency output of detector demodulator circuit 302 tuned to receive the signal broadcast by transmitter 257. After squaring by the amplifier 450, the resulting signal is represented by waveform B of FIG. 9, while waveform C thereof represents the out-of-phase squared modulation frequency output of the other amplifier 452. See reference characters B and C in FIG. 8. The delay circuit 454 is used to restore the phase relationship by delaying the negative-going transition of waveform B. The output from delay circuit 454 is waveform D, which has a series of pulses the negative-going transitions of which coincide (are in phase) with the corresponding transitions of waveform C. These transitions are applied to respective differentiating amplifiers 456 and 458 to produce respective output waveforms E and F. As a result of the in-phase relationship, waveforms E and F coincide at the inputs of the AND-gate 460. Such coincidence produces a gate output in the form of waveform G which triggers the latching amplifier 316. Once the amplifier 316 is turned on, it develops a continuous high potential output (waveform H) to drive the audible alarm gong or other output device 318.

So far as the detailed operation of the squaring amplifier circuits 450 and 452 is concerned, the modulation frequency sinusoidal outputs of the respective low-pass filters 410 and 412 are coupled through respective resistors 462 and 464 to the bases of respective switching transistors 466 and 468. The outputs of the transistors are developed across collector load resistors 470 and 472 respectively. The AC components of these collector outputs are coupled through respective capacitors 474 and 476, bidirectional diode pairs 478, 480 and 482, 484, capacitors 486 and 488, and resistors 490 and 492 for feedback to the bases of the transistors 466 and 468. This feedback signal, which is developed across resistors 494 and 496 in the case of circuit 450 and grounded resistors 498 and 500 in the case of circuit 452, serves to drive transistors 466 and 468 into saturation or cutoff, depending upon the instantaneous polarity of the sinusoidal input signal. As a result, the collector output applied to circuits 454 and 458 is either a positive-going or a negative-going phase of a square wave having the same frequency as the sinusoidal signal. The emitter load currents are carried by respective resistors 502 and 504, and the AC components of the emitter voltage are shunted to ground by respective capacitors 506 and 508.

The square wave output of circuit 450, but not of circuit 452, has its negative-going transition delayed by a monostable multivibrator (or one-shot) circuit 454 comprising a pair of switching transistors 508 and 510 cross-coupled in a mutual feedback relationship. The square wave (waveform B) is AC coupled by means of a capacitor 512 and diode 518 to the base of transistor 508. That transistor is normally on, and thus normally develops a negative output across its collector load resistor 520. In order to keep transistor 508 normally on, biasing current flows from the positive power supply terminal 520 through a biasing resistor 522, the diode 518, and a biasing resistor 514 to the ground bus 524. The voltage normally applied to the base of transistor 508 by the voltage divider comprising resistors 522 and 514 when this biasing current flows is sufficiently high to keep transistor 508 in conduction.

But when the negative-going transition of square wave B is applied through the coupling capacitor 512 and diode 518, the current path from resistor 522 through diode 518 is diverted through coupling capacitor 512 to the collector of transistor 466 until the capacitor 512 is charged. This momentarily reduces the base voltage applied to transistor 508, to turn that transistor off. With transistor 508 off, the current flowing from the positive power supply terminal 520 through the load resistor 526 is no longer drawn by the collector of transistor 508, and is diverted instead through resistor 528 and the base-emitter path of transfer 510, turning on that transistor. Transistor 510 then draws collector current through its load resistor 529, driving its collector negative as a result of the drop across that resistor. This negative voltage is coupled through capacitor 530 to the base of transistor 508, holding the latter transistor off. The resulting absence of collector load current causes a smaller signal to be developed across resistor 526, so that the output level applied to the following circuit 456 is high. This condition persists as long as charging current flows through capacitor 530, even though the negative transition of waveform B which originally triggered these events has been completed. The interval during which the output voltage of circuit 454 remains high produces the positive-going pulse seen in waveform D of FIG. 9, starting at the time that waveform B goes negative.

Eventually, however, coupling capacitor 530 charges, and current no longer flows through it to keep transistor 508 cut off. At that point, since the negative transition of waveform B which originally turned off transistor 508 has been completed, the voltage divider 522, 514 now turns transistor 508 back on. Then current is drawn through load resistor 526 once again by the collector of transistor 508, diverting it from resistor 528 and the base of transistor 510, so that the latter transistor turns off. As these events occur, the collector voltage of transistor 508 drops sharply, producing the negative-going transition in waveform D of FIG. 9. At this point, initial conditions are restored. Diodes 516 and 532 are connected between the emitter and base electrodes of transistors 510 and 508 respectively to act as storage capacitors which cause prompt turn-on of the transistors at the appropriate times.

The negative-going transition of waveform D is applied to differentiating amplifier 456, where it is AC coupled by means of a capacitor 540 to the base of a switching transistor 542. That transistor is normally on, because of the connection from positive power supply terminal 544 through limiting resistor 546. The collector current normally drawn through load resistor 548 causes a drop across that resistor which keeps the collector output voltage low while transistor 542 is on. But when the negative transition is coupled through the capacitor 540, transistor 542 if briefly turned off during the short interval required for capacitor 540 to charge. During that brief interruption the collector current through load resistor 548 is cut off, resulting in a brief positive pulse of collector voltage (as seen in waveform E of FIG. 9) in response to the negative-going transition of waveform D.

The negative-going transition of waveform C in FIG. 9, which represents the same signal as waveform B, but with a phase shift introduced by network 405, is applied by squaring amplifier 542 to the other differentiating amplifier 458, which is identical to circuit 456. The negative input is coupled through a capacitor 550 to the base of a transistor 552. The connection from a positive power supply terminal 554 through a resistor 556 to the base of the transistor 552 normally keeps that transistor on, drawing collector load current through a resistor 558, so that the collector voltage is low. However, when the negative input is applied through capacitor 550, transistor 552 is briefly cut off to cause a brief positive pulse of collector voltage as seen in waveform F of FIG. 9.

Differentiating amplifier 456 responds to the negative-going transition of waveform B to produce the delayed negative transition of waveform D. This delayed negative transition coincides with the negative transition of waveform C if the received signal has a phase difference between waveforms B and C corresponding to the delay period of the monostable multivibrator (one-shot) circuit 454. This delay period in turn is designed to match the phase difference introduced by the phase shift network 405. Thus, when the intended signal is received, the positive-going pulses of waveform E and F are applied by respective differentiating amplifiers 456 and 458 as simultaneous inputs to the AND-gate 460.

The latter is a conventional coincidence circuit in which a current flows through a resistor 560 and therefore produces a low voltage to back-bias a diode 562 whenever either one of the diodes 564 and 566 is connected to a low output from its respective differentiating amplifier 456 or 458. However, when both these inputs go high simultaneously, representing the coincidence of the positive pulses in waveforms E and F of FIG. 9, diode 562 is momentarily forward-biased and current flows through the resistor 560, diode 562, and a resistor 564 of circuit 316 to ground.

Coincidence conditions therefore cause a current through the resistor 564 to develop a positive voltage across that resistor relative to ground. That positive voltage is applied to the gate electrode of an SCR 566, turning on the SCR so that load current is then drawn from a positive power supply terminal 568 through the audible output device 318 and the load path of the SCR 566 to ground. The anode voltage of the SCR 566 thus rises sharply as shown by waveform H of FIG. 9 at the time that the circuit 316 is triggered.

The SCR 566 will remain latched in its conductive condition thereafter, so long as its load current path through device 318 is no interrupted. As a result, the brief actuation of the resonant spring-mass system 38, 40 to generate momentary power and signal voltages for the transmitters 257 and 259 produces a result, the latching of circuit 316, which can endure indefinitely beyond the interval of resonant vibration of the spring-mass system 38, 40. This means that an operator who pushes a button to actuate the generator 20, or a burglar who inadvertently actuates the generator 20, or actuation thereof in response to ambient conditions, although causing the generator 20 to actuate the transmitters 257 and 259 for a brief interval only, will nevertheless latch the circuit 316 and thereby sound the gong 318 continuously until someone hears it and turns off the gong.

If the output device 318 is a gong of the type which repeatedly interrupts its own circuit by means of breaker contacts, then it is necessary to provide a bypass path comprising a limiting resistor 570 and a switch 572 normally kept closed to sustain conduction of the SCR 566 despite the operation of the breaker points. To turn off the gong, switch 572 may be opened; then an instant later when the gong 318 interrupts its own circuit the SCR 566 will turn off the circuit 316 will be thereby turned to its unlatched condition. Then the switch 572 can be reclosed and the circuit is ready for the next sounding of the gong 318.

The switch 572 also provides a convenient way of testing the alarm system of FIG. 8. If that switch is left open and the generator 20 is actuated, a single brief clapping of the gong 318 will result, after which the opening of the breaker contacts will unlatch circuit 316 in the manner described. This brief sounding of the gong 318 for test purposes will not last so long as to alert people in the vicinity and make them think that true alarm conditions exist, but it will be audible to the operator who is testing the circuit to indicate to him that it is functioning properly.

It will be recognized that more than one transmitter (or pairs of transmitters) may be employed to actuate a single receiver-alarm. Thus, for example, if the device is to be used as a burglar alarm, a number of cantilever-generator-powered transmitters may be dispersed throughout the house or building in association with various windows and doors, with each of the transmitters tuned to actuate a single alarm. Similarly, a plurality of transmitters powered by cantilever generators that are triggered by bimetals could be dispersed in the several rooms of the house or office with each of them adapted to trigger the alarm of a single receiver.

Figure 10:
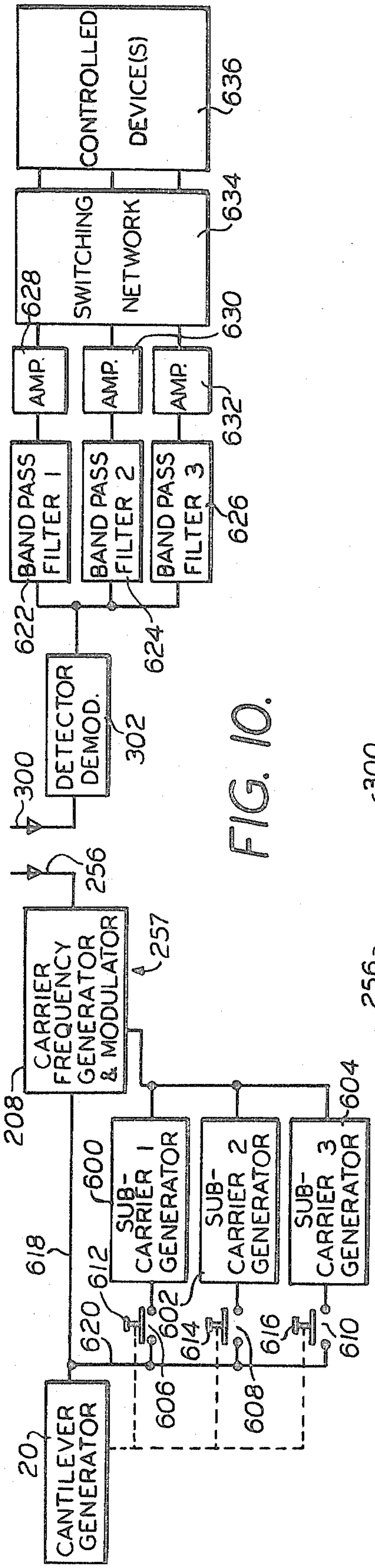
FIG. 10 is a functional block diagram of a three-channel frequency-coded remote control system constructed in accordance with still another embodiment of this invention.

The cantilever generator 20 of this invention also lends itself very well to various different applications providing a plurality of frequency-coded radio remote control channels for turning on and off respective appliances at remote locations or for controlling such appliances, such as, for example, the remote selection of a television channel for viewing. A system of this type, which achieves a high degree of immunity to radio frequency interference and other noise sources, is shown in FIG. 10. There it is seen, for example, that three different modulating signal frequencies for three different remote control channels are supplied by three different subcarrier generators 600, 602 and 604 respectively. A transmitter 257 comprising a carrier frequency generator and modulator circuit 208 identical to circuit 208 of FIG. 6 similarly broadcasts a carrier frequency radio signal by means of an antenna 256 just as previously described. All three subcarrier generator circuits 600, 602 and 604 are permanently connected to supply lower frequency modulating signals, subcarrier 1, subcarrier 2 and subcarrier 3 respectively for their respective remote control channels. But only one of the subcarrier generators actually modulates the transmitted signal because it alone receives power from the generator 20, the others being inactive because they are not connected to the power supply.

A switch 606 controls the power supply to subcarrier generator 600, a switch 608 does the same for subcarrier generator 602, and a switch 610 does the same for subcarrier generator 604. Individual manual pushbuttons 612, 614 and 616 operate the respective switches, and all of the pushbuttons are mechanically connected to actuate the power generator as by twanging the cantilever arm 40. Therefore, whenever any one of the pushbuttons is depressed the power generator 20 supplies power over a lead 618 to operate the circuit 208 so that the carrier frequency wave is broadcast from the antenna 256. At the same time, power is made available over lead 620 to only one of the subcarrier generators 600, 602 or 604, depending upon which particular one of the buttons 612, 614 or 616 was used to actuate the power generator 20. Then that particular subcarrier generator receives power from lead 620 and its associated switch 606, 608 or 610, enabling it to apply a low-frequency signal to the circuit 208 for modulating the carrier.

Just as in FIG. 7, the transmitted wave is picked up by an antenna 300 and applied to a detector-demodulator circuit 302 tuned to the carrier frequency. The low-frequency modulating signal detected by the circuit 302 is applied to a plurality of band-pass filter circuits 622 tuned to subcarrier frequency 1, 624 tuned to subcarrier frequency 20, and 626 tuned to subcarrier frequency 3. Respective amplifier circuits 628, 630 and 632 are provided at the outputs of the filters. At any given time, only one subcarrier modulating frequency will appear at the output of the detector-demodulator circuit 302, and that signal will pass through the appropriate one of the filters 622, 624 or 626 to drive the associated one of the amplifier circuits 628, 630 or 632.

The output of the selected one of the amplifier circuits is applied to what may be regarded as a generalized switching network 634 which in turn sends an appropriately connected output to controlled device(s) 636. Depending upon the application desired, the block designated 636 may comprise a plurality of separate appliances, one for each of the subcarrier generators provided. In the specific example of FIG. 10 there would be three separate controlled appliances corresponding to subcarrier generators 600, 602 and 604, respectively. In this type of system, pushbutton 612 is employed to actuate a first appliance by means of subcarrier frequency 1, pushbutton 614 is used to turn on a second appliance by means of subcarrier 2, and pushbutton 616 is used to turn on a third appliance by means of subcarrier 3. Obviously any number of subcarrier generators and corresponding frequency-coded remote control channels could be provided.

Alternatively, the block indicated by reference character 636 could represent a single controlled device, and switching network 634 could comprise a memory circuit to retain information as to the order in which the pushbuttons 612, 614 and 616 are operated. In that type of application the system of FIG. 10 becomes an electronic combination lock. If the pushbuttons are depressed in the proper order, switching network 634 thereafter issues an output which operates the controlled device 636. If the pushbuttons are actuated in some other sequence, then switching network 634 does not insure that output, and may even issue another output which actuates an alarm to warn of an unauthorized attempt to use the controlled device 636.

In either case, the remote control system of FIG. 10 is relatively secure from radiofrequency noise because of the fact that in order to drive one of the amplifiers 628, 630 or 632 the received signal must have the carrier frequency of circuit 208 in order to pass the detector demodulator circuit 302, and must also be modulated by one of the subcarrier frequencies 1, 2 or 3 in order for the low-frequency modulating signal to pass one of the filters 622, 624 or 626.

Figure 11:
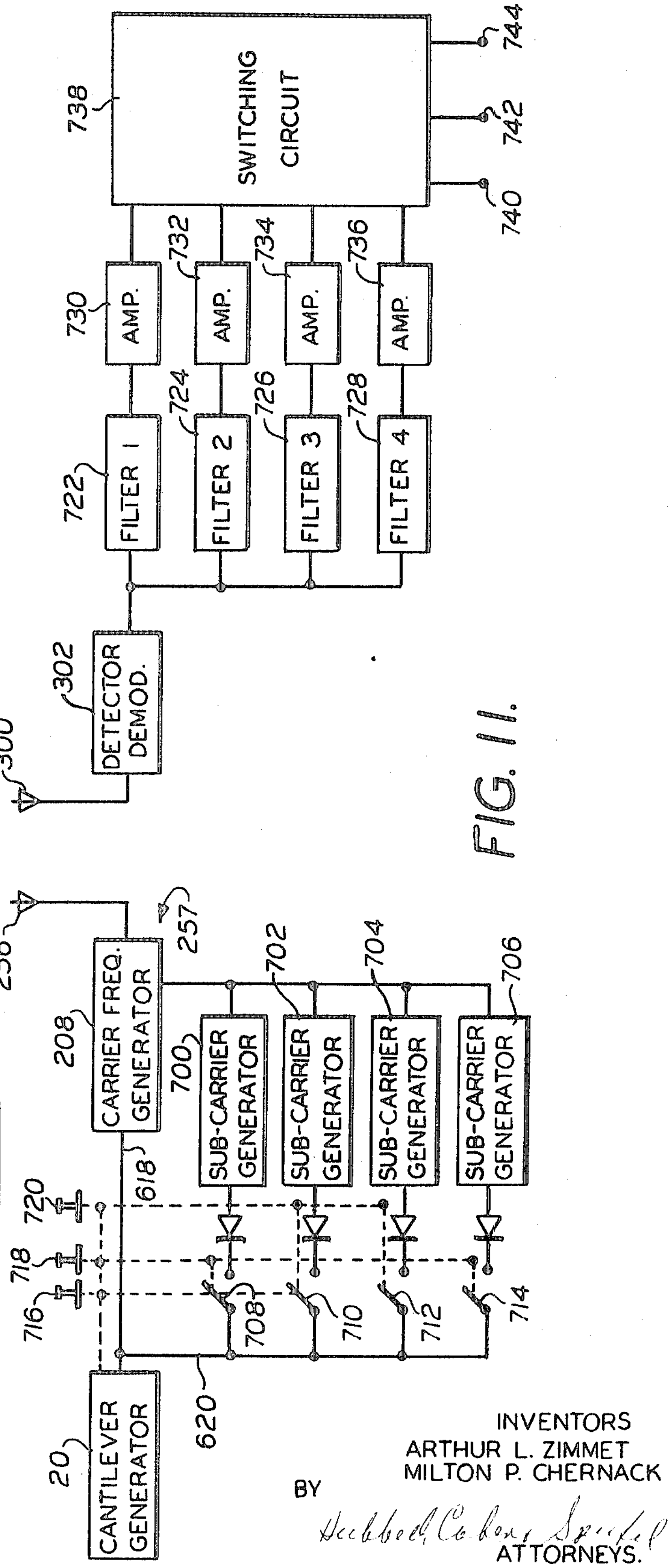
FIG. 11 is a functional block diagram of a variation of the circuit of FIG. 10.

However, if still greater radio noise immunity is desired, then the more sophisticated system of FIG. 11 may be employed as a radiofrequency remote control device. In this arrangement the power generator 20 once again provides power over a lead 618 to a transmitter 257 comprising a carrier frequency generator 208 and an antenna 256. The broadcast is picked up at a remote location by an antenna 300 driving a detector-demodulator circuit 302. In addition, the power provided by the generator 20 is once again made available selectively to subcarrier generators over a lead 620. In this embodiment there are, for example, four subcarrier generators 700, 702, 704 and 706, all of which are permanently connected to provide a low-frequency demodulating signal to the carrier frequency generator circuit 208. Switches 708, 710, 712 and 714 connect the power available on the line 620 to their respective subcarrier generators.

However, the number of manual pushbuttons 716, 718 and 720 is smaller than the number of power switches 708, 710, 712 and 714 operated thereby e.g. only three pushbuttons operating four switches in the particular example of FIG. 11. Pushbutton 716 is connected to operate two power switches 708 and 710, pushbutton 718 is connected to operate two power switches 708 and 714, and pushbutton 720 is connected to operate two power switches 710 and 612. Generalizing from this particular example, each pushbutton operates a selected combination of two or more switches so that a corresponding combination of subcarrier generators is connected by those switches to the power available over the lead 620. In addition, each of the pushbuttons 716, 718 or 720 actuates the power generator 20 as by twanging the cantilever arm 40. As a result, when one of the buttons is depressed the generator 20 supplies power to operate the carrier frequency generator 208 and also to operate a selected combination of two or more subcarrier generators 700, 702, 704 or 706. Then a signal is broadcast from antenna 256 which comprises the carrier frequency modulated simultaneously by two or more lower subcarrier frequencies.

When this occurs the broadcast wave is picked up by antenna 300 and detected by the detector-demodulator circuit 302 tuned to the carrier frequency of circuit 208. The resulting low-frequency output from the detector-demodulator circuit 302 contains two or more of the subcarrier frequencies as control signals. This output is applied to filter circuits 722, 724, 726 and 728 which are tuned to the individual subcarrier frequencies of generators 700, 702, 704 and 706 respectively. As a result, a selected combination of two or more filters will provide modulating signal outputs to their respective amplifiers 730, 732, 734 or 736. The amplifier outputs are applied to a switching circuit 738 which may be a conventional diode decoding matrix. Such a matrix provides an output at a selected one of a plurality of output terminals 740, 742 or 744, the choice of which depends upon which particular combination of inputs is applied to the circuit 738 by the amplifiers 730, 732, 734 and 736.

Thus, when the operator depresses button 718 to modulate the carrier frequency with the subcarrier frequencies of generators 700 and 702, only filter circuits 722 and 724 will be activated to drive only their associated amplifiers 730 and 732. This particular combination of inputs will cause switching circuit 738 to produce an output only on output terminal 740 to turn on the particular appliance controlled thereby. In a similar manner, button 718 selects subcarrier generators 700 and 706, filters 722 and 728, amplifiers 730 and 736, and the appliance connected to output terminal 742; while button 720 selects subcarrier generators 702 and 704, filters 724 and 726, amplifiers 732 and 734, and the appliance connected to output terminal 734.

Thus, the system of FIG. 11 provides for example three distinct radio remote control channels to control three appliances connected to respective output terminals 740, 742 and 744 in response to operation of respective buttons 716, 718 and 720. The system is particularly immune to radiofrequency noise by virtue of the fact that each channel is frequency combination coded. No controlled device connected to a particular one of the output terminals 740, 742 or 744 will be operated unless the detector demodulator circuit 302 detects the carrier frequency of generator circuit 208 and in addition two of the filter circuits 722, 724, 726 and 728 are simultaneously driven by their respective modulating signal frequencies of the associated subcarrier generators 700, 702, 704 and 706.

It will now be appreciated that this invention not only provides a unique signal generator which provides power for the radiation of a brief control signal, but also provides power and in some instances the modulating signal for impressing suitable intelligence upon the radiofrequency carrier. In addition, various coding approaches employing individual subcarrier generators or individual phases of the alternating output of the signal generator itself may be employed to provide various degrees of immunity to radiofrequency noise so as to avoid spurious operation. The resulting signaling systems are ideally suited for wireless doorbells, burglar alarms, fire alarms and the like, as well as remote control of various appliances. It is especially interesting for a remote television channel selection system and may be used with a single pushbutton to actuate a stepping switch within the television set to progress the tuner from channel to channel or it may be used so that each of the pushbuttons 716, 817, 720, etc. is associated with a particular channel.

Since the foregoing description and drawings are merely illustrative, the scope of protection of the invention has been more broadly stated in the following claims, and these should be liberally interpreted so as to obtain the benefit of all equivalents to which the invention is fairly entitled.

The invention claimed is:

1. A device for generating an interference-resistant electrical alarm signal upon the occurrence of a predetermined event, comprising:

a. means for generating a relatively low frequency alternating signal including
   i. a magnetic circuit including a source of magnetic flux,
   ii. a coil in flux linking relationship with said magnetic circuit;
   iii. means for varying the amount of flux linking said coil including an oscillatably mounted arm and means for setting said arm into oscillation, b. first and second R.F. transmitter means for simultaneously broadcasting at first and second carrier frequencies, respectively, said carrier frequencies being different;

c. a circuit connected to rectify said generator frequency alternating potential and to simultaneously supply the resulting unidirectional power for energizing said first and second R.F. transmitter means to simultaneously transmit signals at said carrier frequencies for a brief interval;

d. first means responsive to said generator to apply said generator frequency as a first modulation signal to modulate said first carrier frequency signal broadcast by said first transmitter means, second means responsive to said generator to apply said generator frequency out of phase with first modulation signal as a second modulation signal to modulate said second carrier frequency signal broadcast by said second transmitter means; and e. means for latching said arm in a potential energy storing condition and for thereafter abruptly releasing it upon the occurrence of said event.

2. A device as in claim 1, further comprising means for moving said arm relative to said latching means for bringing said arm into latching engagement with said latching means.

3. A device as in claim 1 for detecting a fire, wherein said latching means comprises a bimetallic member for maintaining said latching means in position to latch said system below a threshold temperature, and for moving said latching means out of said latching position when said threshold temperature is reached.

4. A device as in claim 1, wherein said system vibrating means comprise a device for applying a sudden vibrating impulse to said system when said system is at rest upon the occurrence of said event.

5. A device as in claim 1, wherein source of magnetic flux is a permanent magnet mounted on said oscillatable arm for oscillation therewith, whereby to vary the amount of flux linking said coil.

6. A device as in claim 1, wherein said magnetic circuit comprises a highly permeable frame defining a pair of spaced-apart pole pieces, said coil is wound on said frame, said source of magnetic flux is a permanent magnet disposed between said pole pieces, said arm is resilient and is mounted at one end, said permanent magnet being mounted on the other end of said arm for oscillation therewith.

7. Signaling means as in claim 1 further comprising a receiver including:

means tuned to said first carrier frequency for detecting said first broadcast signal; means tuned to said second carrier frequency for detecting said second broadcast signal;

controlled means;

and means connected to the outputs of both said first and second detecting means and selectively responsive to simultaneous outputs of said first and second modulation signals from said detectors to turn on said controlled means.

8. Signaling means as in claim 7, wherein;

said controlled means comprises an indicating device and a latching circuit connected to drive said indicating device;

and said modulation frequency-responsive means triggers said latching circuit in response to said simultaneous modulation signal outputs.

9. Signaling means as in claim 7 wherein;

said selectively responsive means comprises a phase-sensitive circuit selectively responsive to said simultaneous first and second respective modulation signal outputs from said detectors which are in substantially the phase relationship of said first and second modulating signals.

10. Signaling means as in claim 9, wherein said selectively responsive means comprises at least one filter connected at the output of one of said detectors for selectively passing said modulation signal.

11. Signaling means as in claim 9, wherein said selectively responsive means comprises;

means for squaring said modulation signal detector outputs;

a circuit connected to delay the more advanced one of said squaring circuit outputs by a period substantially equal to said phase difference whereby to produce a substantially in-phase relationship;

means responsive to said in-phase relationship to generate transition markers;

and a gate connected to turn on said controlled means upon coincidence of said transition markers.